(12) United States Patent
Lawson et al.

(10) Patent No.: US 12,459,760 B2
(45) Date of Patent: **\*Nov. 4, 2025**

(54) GANGWAY HAVING SELF-RAISING ASSEMBLY

(71) Applicant: SAFE RACK LLC, Andrews, SC (US)

(72) Inventors: John Rutledge Lawson, Chapin, SC (US); James Michael O'Keefe, Columbia, SC (US); Jeff W. Reichert, Pawleys Island, SC (US); Jeffrey David Scott, Cornelius, NC (US)

(73) Assignee: Safe Rack LLC, Andrews, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,738

(22) Filed: May 24, 2024

(65) Prior Publication Data
US 2024/0308794 A1    Sep. 19, 2024

Related U.S. Application Data

(63) Continuation of application No. 18/202,826, filed on May 26, 2023, now Pat. No. 11,993,471, which is a
(Continued)

(51) Int. Cl.
*B65G 69/24*       (2006.01)
*E01D 15/08*       (2006.01)
(Continued)

(52) U.S. Cl.
CPC ............. *B65G 69/24* (2013.01); *E01D 15/08* (2013.01); *E01D 19/00* (2013.01); *F15B 1/02* (2013.01);
(Continued)

(58) Field of Classification Search
CPC ............ B65G 69/2864; B65G 69/2817; B65G 69/287; B65G 67/02; B65G 69/2805;
(Continued)

(56) References Cited

U.S. PATENT DOCUMENTS

| 1,648,574 A | 11/1927 | Brown et al. |
| 4,443,905 A | 4/1984 | Kopp |

(Continued)

OTHER PUBLICATIONS

Extended European Search Report for European application No. 20784068.7 dated Dec. 12, 2022; 7 pages.
(Continued)

*Primary Examiner* — Abigail A Risic
(74) *Attorney, Agent, or Firm* — Nelson Mullins Riley & Scarborough LLP

(57) ABSTRACT

A gangway comprises a fixed platform and a support structure connected to the fixed platform in a manner that allows the support structure to rotate with respect to the fixed platform between a raised stowed position and a lowered deployed position. A raising assembly is operative to rotate the support structure from the deployed position to the stowed position. The raising assembly includes at least one fluid actuated cylinder connected between the fixed platform and a distal end of the support structure. A raising actuator is usable by an operator to cause operation of the cylinder in a manner that rotates the support structure toward the stowed position.

13 Claims, 8 Drawing Sheets

Related U.S. Application Data continuation of application No. 17/574,739, filed on Jan. 13, 2022, now Pat. No. 11,685,618, which is a continuation of application No. 16/839,787, filed on Apr. 3, 2020, now Pat. No. 11,254,527.

(60) Provisional application No. 62/829,771, filed on Apr. 5, 2019.

(51) Int. Cl.
 *E01D 19/00* (2006.01)
 *F15B 1/02* (2006.01)
 *F15B 13/04* (2006.01)
 *F15B 13/042* (2006.01)

(52) U.S. Cl.
 CPC ........ *F15B 13/0401* (2013.01); *F15B 13/042* (2013.01)

(58) Field of Classification Search
 CPC ........ B65G 69/28; B65G 69/24; E01D 15/08; E01D 19/00; F15B 1/02; F15B 13/042; F15B 13/0401
 See application file for complete search history.

(56) References Cited

U.S. PATENT DOCUMENTS

| | | |
|---|---|---|
| 4,624,446 A | 11/1986 | Gould |
| 4,864,672 A | 9/1989 | Altieri et al. |
| 5,044,829 A | 9/1991 | Hemminger |
| 5,311,628 A | 5/1994 | Springer et al. |
| 6,951,041 B2 | 10/2005 | Hoofard et al. |
| 7,140,467 B2 | 11/2006 | Cook |
| 7,216,741 B2 | 5/2007 | MacDonald et al. |
| 7,950,095 B2 | 5/2011 | Honeycutt |
| 8,015,647 B2 | 9/2011 | Bennett |
| 8,065,770 B2 | 11/2011 | Proffitt et al. |
| 8,387,191 B2 | 3/2013 | Honeycutt |
| 8,403,109 B2 | 3/2013 | Bennett |
| 8,479,882 B2 | 7/2013 | DuBose et al. |
| 8,800,086 B1 | 8/2014 | Borgerding |
| 9,273,475 B1 | 3/2016 | DuBose et al. |
| 10,087,641 B2 | 10/2018 | Harmon |
| 10,145,070 B2 | 12/2018 | Reichert et al. |
| 10,253,464 B2 | 4/2019 | Lawson et al. |
| 10,457,506 B1 | 10/2019 | Bennett et al. |
| 10,724,256 B1 | 7/2020 | Anderson et al. |
| 11,254,527 B2 | 2/2022 | Lawson et al. |
| 11,685,618 B2 | 6/2023 | Lawson et al. |
| 11,993,471 B2 | 5/2024 | Lawson et al. |
| 2002/0174496 A1 | 11/2002 | MacDonald et al. |
| 2010/0242189 A1 | 9/2010 | Goin et al. |
| 2010/0264596 A1 | 10/2010 | Whitley et al. |
| 2012/0006618 A1 | 1/2012 | DuBose et al. |
| 2015/0000211 A1 | 1/2015 | Whelan |
| 2015/0007509 A1 | 1/2015 | Digmann et al. |
| 2015/0128360 A1 | 5/2015 | Leum |
| 2016/0104364 A1 | 4/2016 | Brooks et al. |
| 2016/0280478 A1 | 9/2016 | Gleason |
| 2017/0073176 A1 | 3/2017 | Yule et al. |
| 2017/0073177 A1 | 3/2017 | Harrington |
| 2017/0211246 A1 | 7/2017 | Reichert et al. |
| 2019/0367299 A1 | 12/2019 | Jeon |
| 2020/0125074 A1 | 4/2020 | Ramos et al. |
| 2021/0221629 A1 | 7/2021 | Honeycutt |
| 2023/0303345 A1 | 9/2023 | Lawson et al. |

OTHER PUBLICATIONS

Hydraulics & Pneumatics, "Accumulators," accessed from http://hydraulicspneumatics.com/200/TechZone/Accumulators/Article/False/6446/TechZone-Accumulators, Feb. 2, 2016, all enclosed pages cited.

International Search Report and Written Opinion dated Jul. 9, 2020 in PCT application serial No. PCT/US2020/026862, all enclosed pages cited.

U.S. Appl. No. 62/962,552, filed Jan. 17, 2020. All enclosed pages cited.

GANGWAY HAVING SELF-RAISING ASSEMBLY

CROSS-REFERENCE TO RELATED APPLICATIONS

This application is a continuation of co-pending application Ser. No. 18/202,826, filed May 26, 2023, which is a continuation of application Ser. No. 17/574,739, filed Jan. 13, 2022, now U.S. Pat. No. 11,685,618, which is a continuation of application Ser. No. 16/839,787, filed Apr. 3, 2020, now U.S. Pat. No. 11,254,527, which is based upon and claims the benefit of U.S. provisional application Ser. No. 62/829,771, filed Apr. 5, 2019. The aforementioned applications are relied upon and incorporated herein by reference in their entireties.

FIELD OF THE INVENTION

The present invention relates to fall restraint equipment, and more particularly, to a gangway that is operative to move between a raised (stowed) position and a lowered (deployed) position.

BACKGROUND OF THE INVENTION

Gangways may be used to provide access from a platform to an area such as the top of a storage container, vehicle, or ship. For example, a semi-trailer truck or a railroad carriage transporting dry goods may need to be inspected, loaded, or unloaded from the container's top. A gangway is used to span the distance between a stationary platform and the top of the container.

In this regard, the proximal end of the gangway is pivotally connected to the stationary platform so as to be stowed in a raised position. Typically, a foot lock is provided to maintain the gangway in the raised position. Once the container is in position, the foot lock is released by the operator, allowing the gangway to move into its lowered position. Once fully lowered, the distal end of the gangway will be adjacent the top of the container. When access to the top of the container is no longer needed (e.g., due to completion of the unloading process), the gangway is manually raised back to the stowed position until the foot lock is engaged.

In a common arrangement, heavy-duty chains are attached on each side of the gangway near its distal end. The chains can be locked with respect to platform uprights to prevent further lowering of the gangway when the desired location is reached. In addition, the chains are pulled to raise the gangway to its raised position.

SUMMARY OF THE INVENTION

The present invention recognizes and addresses the foregoing considerations, and others, of prior art construction and methods.

One aspect of the present invention provides a gangway comprising a fixed platform and a support structure connected to the fixed platform in a manner that allows the support structure to rotate with respect to the fixed platform between a raised stowed position and a lowered deployed position. A raising assembly is operative to rotate the support structure from the deployed position to the stowed position. The raising assembly includes at least one fluid actuated cylinder connected between the fixed platform and a distal end of the support structure. For example, the at least one fluid actuated cylinder may include a cylinder rod having a spacer member attached to a distal end thereof. A raising actuator is usable by an operator to cause operation of the cylinder in a manner that rotates the support structure toward the stowed position.

According to some embodiments, the cylinder retracts to rotate the support structure toward the stowed position. Preferably, the at least one cylinder may include first and second cylinders situated on left and right sides of the support structure, respectively. The raising actuator may comprise a plunger associated with a raising valve, the plunger being movable to change a position of the raising valve. In some embodiments, the plunger is moved outward to cause raising of the support structure whereas, in other embodiments, the plunger is moved inward to cause raising of the support structure.

According to some embodiments, the raising assembly may include a hydraulic pump driven by a motor, such as a pneumatic motor or an electric motor. In the case of an electric motor, embodiments are contemplated in which the electric motor is powered by an AC source. In some embodiments, the electric motor may be powered at least in part by at least one solar panel.

According to some embodiments, the raising assembly may include at least one accumulator. For example, a first rod accumulator and a second blind accumulator may be provided, respectively connected to be in fluid communication with a rod side and a blind side of each of the cylinder(s).

According to some embodiments, the raising actuator may be configured to cease raising of the support structure if released by the operator. According to some embodiments, the raising assembly may further include a lowering actuator usable by an operator to cause operation of the cylinder in a manner that rotates the support structure toward the deployed position. In this regard, the raising assembly may be configured such that the support structure will cease further rotation toward the deployed position if the lowering actuator is released. For example, the lowering actuator may be configured having a master cylinder with an associated lowering plunger, the lowering plunger movable inward to cause unseating of at least one pilot operated check valve.

Another aspect of the present invention provides a gangway comprising a fixed platform and a support structure connected to the fixed platform in a manner that allows the support structure to rotate with respect to the fixed platform between a raised stowed position and a lowered deployed position. A raising assembly is operative to rotate the support structure from the deployed position to the stowed position. The raising assembly includes at least one fluid actuated cylinder connected between the fixed platform and a distal end of the support structure, the cylinder being operative to move so as to rotate the support structure toward the stowed position. A raising actuator in this case comprises a raising plunger associated with a raising valve, the plunger being movable to change a position of the raising valve. According to this aspect, a pneumatic motor is connectable to a compressed air source via the raising valve so as to operate a hydraulic pump.

A still further aspect of the present invention provides a gangway comprising a fixed platform and a support structure connected to the fixed platform in a manner that allows the support structure to rotate with respect to the fixed platform between a raised stowed position and a lowered deployed position. A raising assembly is operative to rotate the support structure from the deployed position to the stowed position. The raising assembly includes first and second cylinders respectively situated on left and right sides of the support structure and connected between the fixed platform and a distal end of the support structure. The cylinders retract to rotate the support structure toward the stowed position. A raising actuator is usable by an operator to cause operation of the cylinders in a manner that rotates the support structure toward the stowed position. In addition, the raising actuator is configured to cease raising of the support structure if released by the operator.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
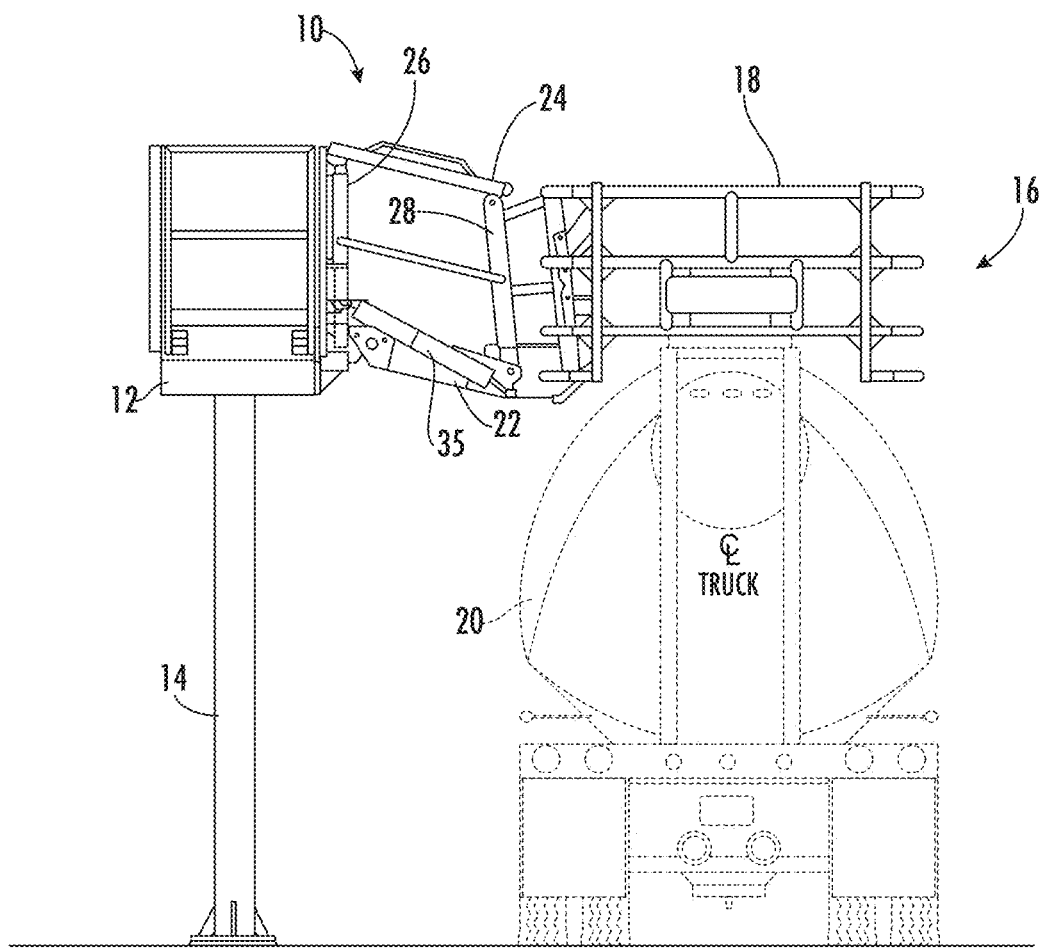
FIG. 1 is a side elevation of a platform equipped with a gangway having a self-raising assembly in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Examples of gangways, their components, and associated fall restraint equipment are set forth in U.S. Pat. No. 7,950,095 (entitled "Gangway and Method for Manufacturing Same"), U.S. Pat. No. 8,387,191 (entitled "Gangway Bearing Retainer Plate"), U.S. Pat. No. 10,145,070 (entitled "Gangway Having Hydraulic Position Locking Assembly"), and U.S. Pat. No. 10,253,464 (entitled "Gangway Having Position Locking Assembly"), all of which are incorporated fully herein by reference for all purposes.

FIG. 1 illustrates a gangway 10 including a self-raising assembly in accordance with the present invention. The proximal end of gangway 10 is pivotally connected to a fixed platform 12 located at the appropriate height (twelve feet in this example). Platform 12 is supported in this case by a support column 14. A cage assembly 16 is pivotally connected to the distal end of gangway 10. As shown, cage assembly 16 includes a rail structure 18 defining an enclosed area within which a worker can stand when cage assembly 16 is lowered into the working position. Typically, cage assembly 16 is lowered so as to be located around an access hatch of a storage container (such as trailer 20). Examples of suitable gangways that may be used with embodiments of the present invention are shown in previously-mentioned U.S. Pat. No. 7,950,095. Another exemplary gangway that may be used with embodiments of the present invention is disclosed in U.S. provisional application Ser. No. 62/962,552 titled "Gangway Assembly," filed Jan. 17, 2020 naming Robert W. Honeycutt as inventor, incorporated fully herein by reference for all purposes.

Gangway 10 has a support structure 22 that pivots with respect to platform 12. (As used herein, the term "platform" may refer to the entire platform 12 or to a portion of gangway 10 which is fixedly attached to an existing platform.) A ramp (or a set of pivotal stairs) is carried by the support structure 22. In this embodiment, gangway 10 further includes a pair of parallel hand rails (e.g., hand rail 24) between which the operator walks to access the top of the container. Respective ends of the handrails are pivotally connected to proximal and distal uprights 26 and 28.

Figure 2:
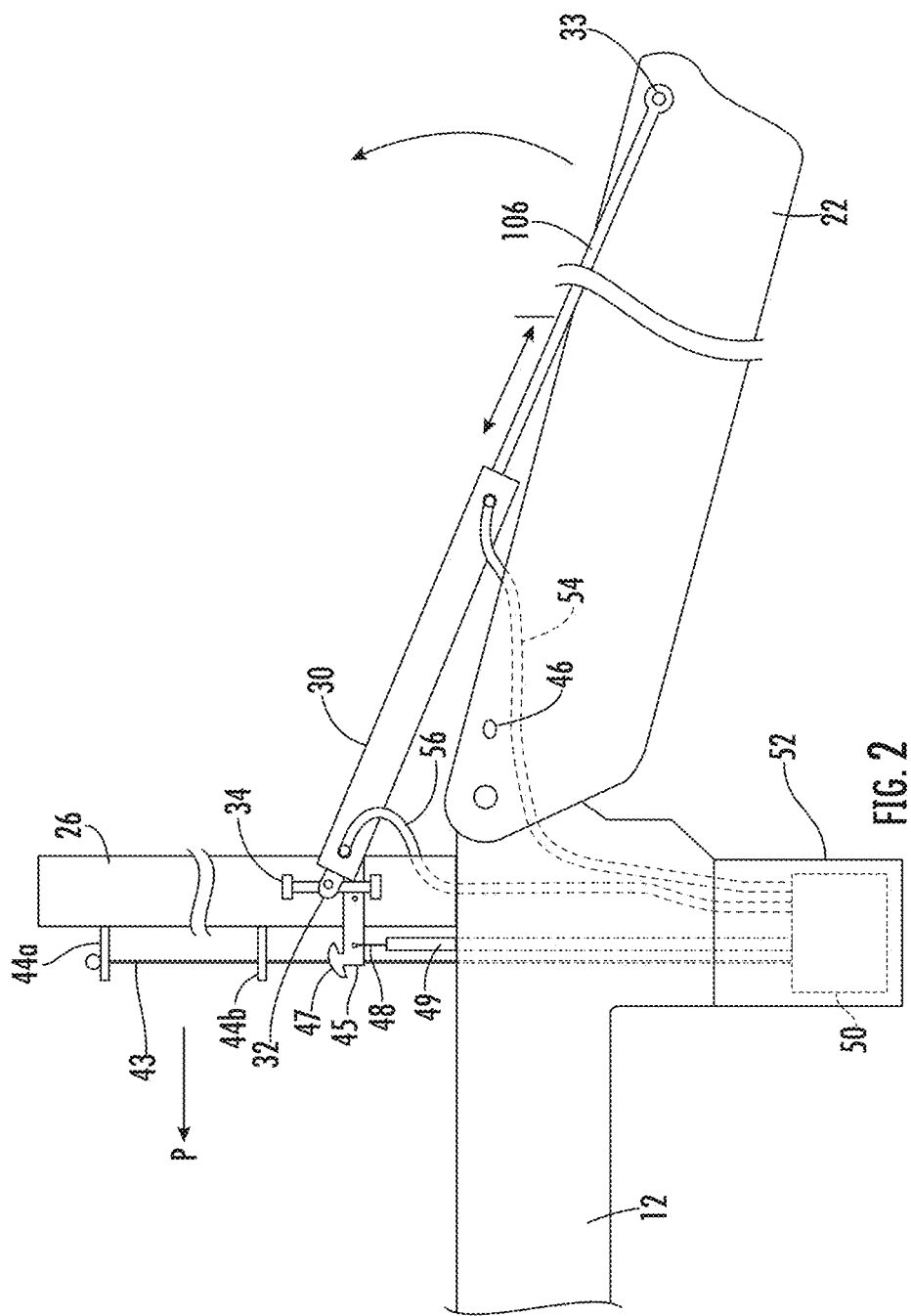
FIG. 2 is an enlarged, simplified elevation showing aspects of the gangway and its raising assembly.

Gangway 10 may be stowed when not use by rotating support structure 22 such that it is oriented in an upward (i.e., generally vertical) position. Referring now also to FIG. 2, the present embodiment incorporates a self-raising assembly (or more simply "raising assembly") that moves support structure 22 to the stowed position when actuated by a user. For example, the raising assembly may include at least one fluid-actuated cylinder 30 which causes the upward movement of support structure 22 while also providing controlled downward movement of support structure 22. In this embodiment, a pair of hydraulic cylinders 30a and 30b (FIG. 3) are provided.

Cylinders 30a and 30b are located in this embodiment on left and rights sides of support structure 22. As indicated at 32 and 33, each such cylinder may be connected in this embodiment between a fixed structure at platform 12 and the area of the distal end of support structure 22. (As used herein, the terms "proximal end" and "distal end" of the support structure and/or gangway refer to the area near the actual ends nearer to and farther from the platform.) Preferably, for example, cylinders 30a and 30b may be positioned at the same location where gangways of the prior art have left and right counterbalanced springs. For example, the proximal end of cylinder 30 is in this case attached to a mount 34 which is itself attached to the outboard side of upright 26. In this regard, a prior art gangway may be retrofit according to the present invention, or a new gangway according to the present invention may be substituted for one of the prior art. In fact, the cylinders may be covered which a sheath 35 (FIG. 1) similar to those used in the past for the counterbalanced springs.

Figure 3:
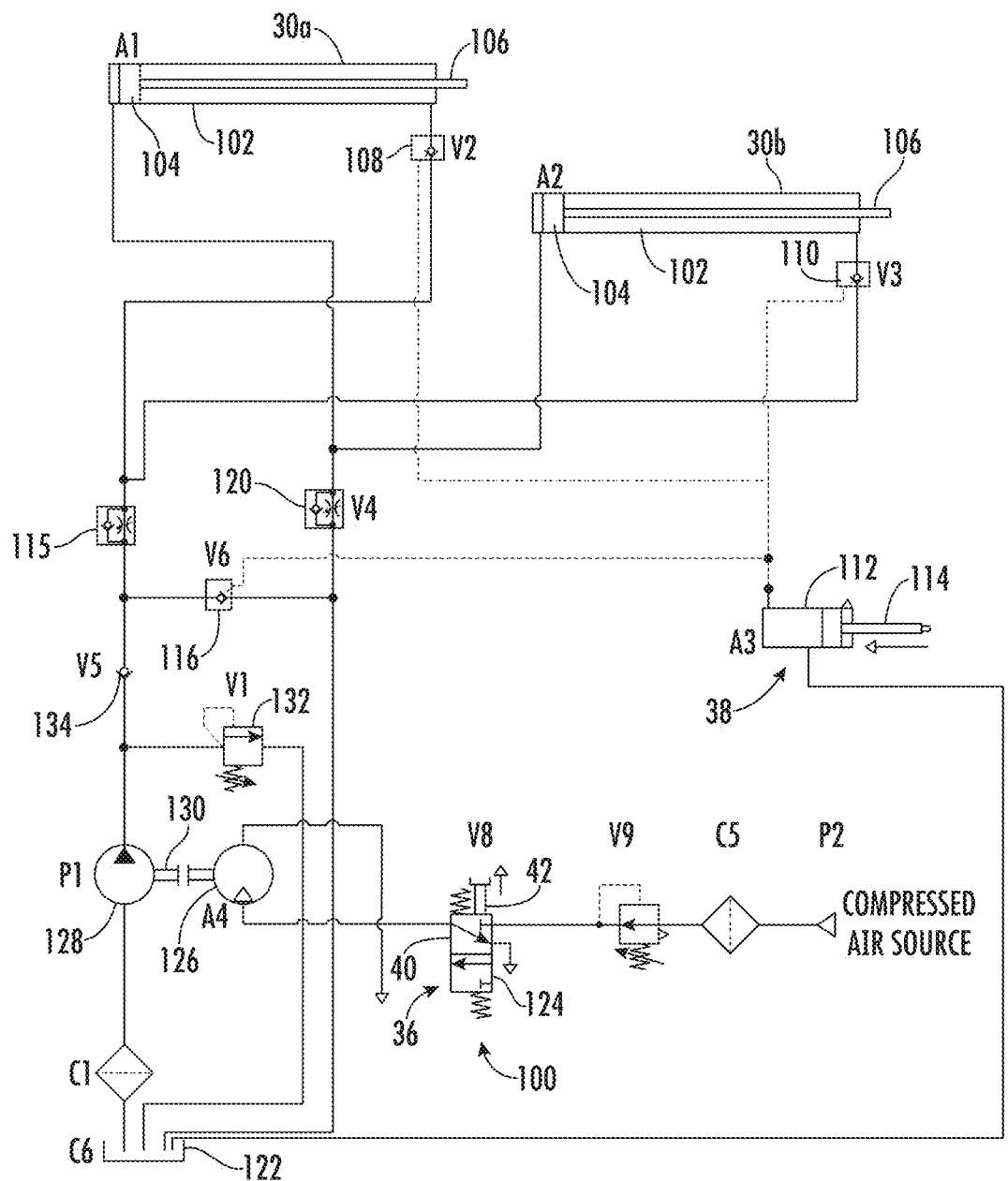
FIG. 3 is a schematic hydraulic circuit diagram illustrating a raising assembly in accordance with an embodiment of the present invention.

Referring now also to FIG. 3, a pair of actuators 36 and 38 may be provided to control functions of the raising assembly. For example, actuator 36 can be used to effect raising of the support structure 22 into the stowed position. In this embodiment, actuator 36 includes a valve housing 40 and a reciprocating plunger 42. Plunger 42 is spring-loaded to be normally in an off position (shown), but can be pulled by a user into an actuation position to actuate the raising assembly. For example, a pull rope 43 (FIG. 2) may be interconnected to plunger 42 so that plunger 42 can be pulled by an operator standing on the platform 12. In this embodiment, the upward movement of plunger 42 occurs when the operator pulls rope 43, as indicated by arrow P, in the region between upper and lower guides 44*a-b*. In other embodiments, the end of rope 43 is simply pulled vertically upward. In any event, as described more fully below, the user must continue pulling plunger 42 in this embodiment as support structure 22 is raised. If the user ceases to maintain plunger 42 in the actuation position, support structure 22 will stop at its current, partially-raised position. Other embodiments are contemplated in which plunger 42 may be pushed into an actuation position.

Actuator 38 is operated in this embodiment by the foot lock 45 which is used to lock the gangway in the stowed position. As is well-known in the art, such foot locks engage a small post 46 located on the side of support structure 22. When the operator wishes to lower support structure 22, the pedal 47 of foot lock 45 is depressed, causing foot lock 45 to see-saw and thereby disengage from the post 46. In accordance with the present invention, however, a cable 48 is attached to foot lock 45 near pedal 47. Depressing pedal 47 thus causes cable 48 to slide with respect to its sheath 49 so as to operate actuator 38. Embodiments are contemplated in which pedal 44 must be depressed the whole time that support structure 22 is lowered or else the lowering will stop and the support structure 22 will remain at its current position. This allows the operator to precisely control lowering of the gangway to containers of different heights. In other embodiments, pedal 44 may be momentarily depressed to begin the lowering process but the lowering process will thereafter continue.

The raising assembly is preferably configured to have a compact design that allows various other of its components (described more fully below) to be conveniently housed in an out-of-the-way location. As indicated at 50, for example, these components may be located in a housing 52 that depends from the underside of platform 12. Various hoses, such as hose 54 and 56, interconnect cylinder(s) 30, actuator 36, actuator 38, and the components 50.

FIG. 3 schematically illustrates a gangway raising assembly 100 in accordance with an embodiment of the present invention. As can be seen, cylinders 30*a* and 30*b* each have a housing 102 containing a piston 104. A rod 106 is attached to one side of each piston 104 and extends outside of the housing 102. Rods 106 are shown fully retracted in this view as they would be when the gangway is in the stowed position. Hydraulic fluid is trapped on the rod side of piston 104 by pilot operated check vales 108 and 110.

As discussed above, actuator 38 is utilized to lower the gangway. In this embodiment, actuator 38 comprises a master cylinder 112 having a plunger 114. Master cylinder 112 is actuated by pushing in plunger 114, such as by depressing foot pedal 47 as described above. This action compresses a fixed volume of fluid between the master cylinder and pilot operated check valves 108, 110, and 116. As a result, check valves 108, 110, and 116 will be unseated to allow fluid flow. Fluid is thus able to circulate from the rod end of the cylinders across valves 108, 110, and 115 to valve 116. Valve 115 has an adjustable orifice that restricts fluid flow, thereby controlling the rate that fluid can leave the rod side of cylinders 30*a* and 30*b*. This limits and controls the rate at which the gangway drops.

With the flow path open as described, gravitational forces acting on the rod pull it outward circulating fluid from the rod side across valves 108 and 110 to valve 115 then valve 116. Fluid continues to flow though valve 116 to the blind end of the cylinders 30*a* and 30*b*. Because the volumes are different between the rod side and blind side of each cylinder 30*a* and 30*b*, a suction due to vacuum is created. This vacuum will pull fluid up from the tank 122 through valve 120 to the blind side of the cylinders 30*a* and 30*b* to make up the volume. Note that valve 120 incorporates a check valve which freely allows flow in this direction.

In this embodiment, removal of physical pressure from master cylinder 112 (i.e., release of plunger 114) will cause plunger 114 to move outward (due to a spring associated with master cylinder 112). Pilot pressure is thus removed on valves 108, 110, and 116, causing them to become seated. Fluid is once again trapped, which stops further downward movement of the gangway.

To raise the gangway, plunger 42 of actuator 36 is moved to shift the position of a valve 124. Plunger 42 is moved upward in this case due to the operator pulling on rope 43 as described above. As a result, air can flow from a compressed air source to an air motor 126. Typically, most locations at which the gangway might be installed will have a compressed air system that can be tapped into for various purposes as needed. In the absence of such a system, a small dedicated air compressor could be provided.

Air motor 126 thus rotates and transmits power to a fluid pump 128 (via shaft 130). Pump 128 pumps fluid from tank 122 to generate pressure at the pump's outlet. (Maximum pressure is preferably regulated by pressure relief valve 132.) Fluid thus flows across check valve 134, but cannot flow across valve 116. The fluid thus flows through valves 108 and 110 to the rod side of the respective cylinder. The pressure in the rod side retracts the pistons, forcing fluid out of the blind side of the cylinders. The rods 106 thus retract, causing the gangway to move toward the stowed position.

By way of further explanation, fluid from the blind side of the cylinders flows out to valve 120 which has an adjustable restricted orifice in parallel to the check valve noted above. This orifice in valve 120 regulates flow and controls the speed that the cylinders can retract (i.e., the speed at which the gangway can be raised). Even though the check valve of valve 116 is in the flow direction, fluid will not flow through valve 116 from valve 120. This is because the outlet pressure from pump 128 on the opposite side of valve 116 exceeds the pressure of the fluid exiting the blind side of cylinders 30*a* and 30*b*. The fluid exiting the blind side of cylinders 30*a* and 30*b* will thus flow into tank 122.

When plunger 42 is released, it moves (e.g., due to an associated spring) and valve 124 switches its position. The compressed air source is thus blocked from supplying air to motor 126. As a result, pump 128 stops pumping. The fluid trapped in the rod side of cylinders 30*a* and 30*b* prevents gravity from pulling the gangway down.

As described in previously-mentioned U.S. Pat. No. 10,145,070, it is desirable to inhibit upward movement of a lowered gangway unless an operator on the platform affirmatively acts to move the gangway into the stowed position. In a lowered condition, the mass of gangway 10 is normally balanced and static due to an increase in pressure in fluid trapped in the blind side of the cylinders. To raise the gangway physically (e.g., to lift its distal end) would require forces significantly greater than a person could exert.

In the event that high forces are applied to the gangway in an upward direction (e.g., a rail car's suspension can generate a lifting force on the gangway as the rail car is unloaded), the present embodiment allows upward slippage of the gangway. In this situation, force is applied to the rod side of the cylinders lowering the pressure in the rod side and pushing fluid out of the blind side of the cylinders. Fluid is free to leave the blind side of the cylinders and flow across the restriction in valve 120 to tank 122. Fluid is also pulled into the rod side of the cylinders across the check valves 108, 110, and 116. If the high forces are removed from the gangway, pressure will rise in the rod side of the cylinder because of gravity. Because of the column of fluid trapped by valves 108 and 110, the gangway will hold in place until: (1) another high force is applied to the end of the gangway; (2) plunger 42 is pulled to raise the gangway; or (3) plunger 112 is pushed to lower the gangway.

Figure 4A:
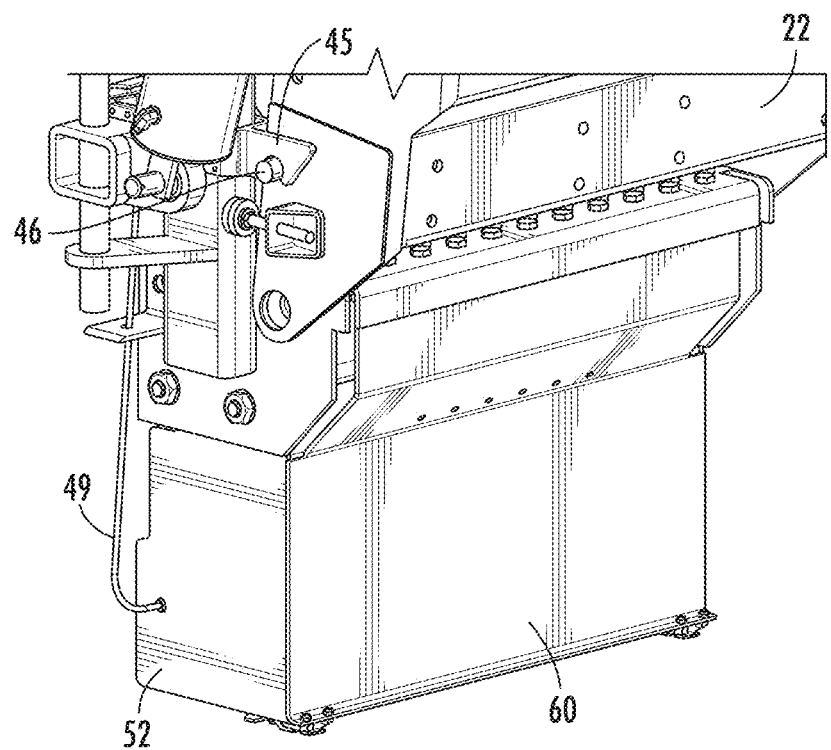
FIGS. 4A and 4B are left and right enlarged perspective views showing a housing for containing components of the raising assembly.
Figure 4B:
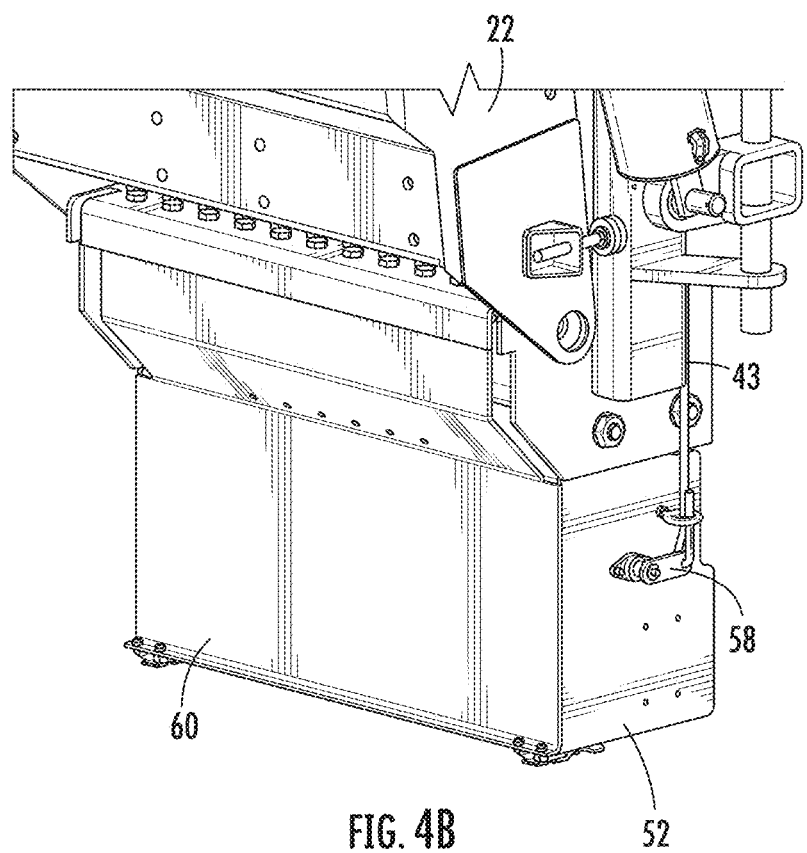

FIGS. 4A and 4B are perspective front views of housing 52 from left and right sides, respectively. As can be seen, sheath 49 extends into the interior of housing 52 from the left side whereas rope 43 connects to a pivotal linkage 58 on the right side of housing 52. Housing 52 may preferably have a hinged cover plate 60 that may be easily opened when access to the housing interior is desired. In this embodiment, housing 52 is attached to the bottom of a stationary base tread via existing mounting holes.

Figure 5:
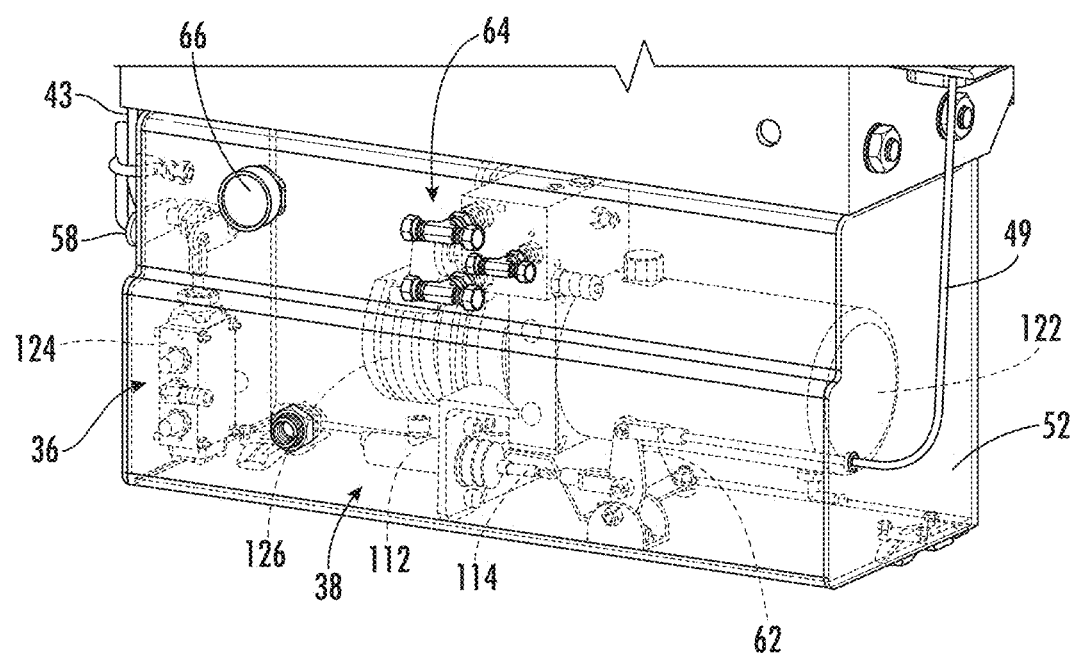
FIG. 5 is a rear perspective view of the housing of FIGS. 4A and 4B shown in phantom to reveal certain components located therein.

Certain additional details can be seen in FIG. 5. For example, it can be seen that push cable 48 connects with plunger 114 in this embodiment via a pivotal linkage 62. Fittings 64 are located on the exterior of housing 52 to provide a convenient location for connecting the cylinder hoses. A corrosion-resistant breather vent 66 is also provided in this embodiment.

Figure 6A:
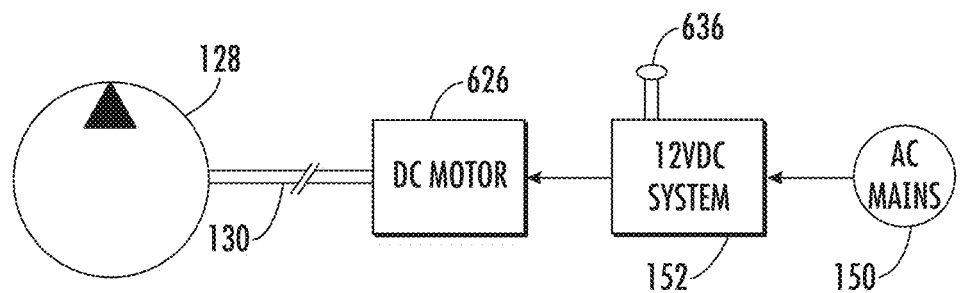
FIGS. 6A and 6B diagrammatically illustrate modifications to the hydraulic circuit of FIG. 3 utilizing an electric motor to drive the hydraulic pump.
Figure 6B:
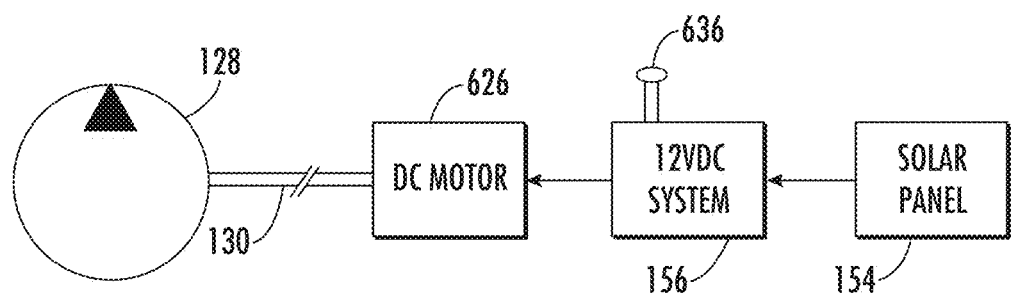

While fluid pump 128 is shown in FIG. 3 being driven by a pneumatic motor, one skilled in the art will appreciate that any suitable driver could be utilized. In this regard, FIGS. 6A and 6B show embodiments in which pump 128 is being driven by an electric motor, in this case a 12-volt DC motor 626. In the embodiment of FIG. 6A, power is supplied by an AC mains source 150, such as a 120 VAC source or a 240 VAC source as are commonly provided in North America. Source 150 supplies the power to appropriate circuitry which converts the AC power to the required DC level (e.g., 12 VDC). Circuitry 152 also includes appropriate switching elements (e.g., solid state or electromechanical relays) to operate motor 626 when raising of the gangway is desired. Preferably, the switching elements will be controlled by actuator 636, which, from the standpoint of the user, operates similarly to actuator 36 described above. As one skilled in the art will appreciate, it may be necessary or desired, especially in the case of 120 VAC power, for circuitry 152 to include one or more internal batteries or other suitable energy storage elements to augment the instantaneous current that the mains source could supply by itself.

In the embodiment of FIG. 6B, power is supplied by one or more solar panels 154 (in addition to or in lieu of mains power). Panel(s) 154 supply the power to appropriate circuitry 156 which stores accumulated solar energy (e.g., using one or more internal batteries or other suitable energy storage elements) and provides it when necessary at the appropriate DC level (e.g., 12 VDC). Circuitry 156 also includes appropriate switching elements (e.g., solid state or electromechanical relays) to operate motor 626 when raising of the gangway is desired. Preferably, the switching elements will be controlled by actuator 636 as described in reference to the previous embodiment.

Figure 7:
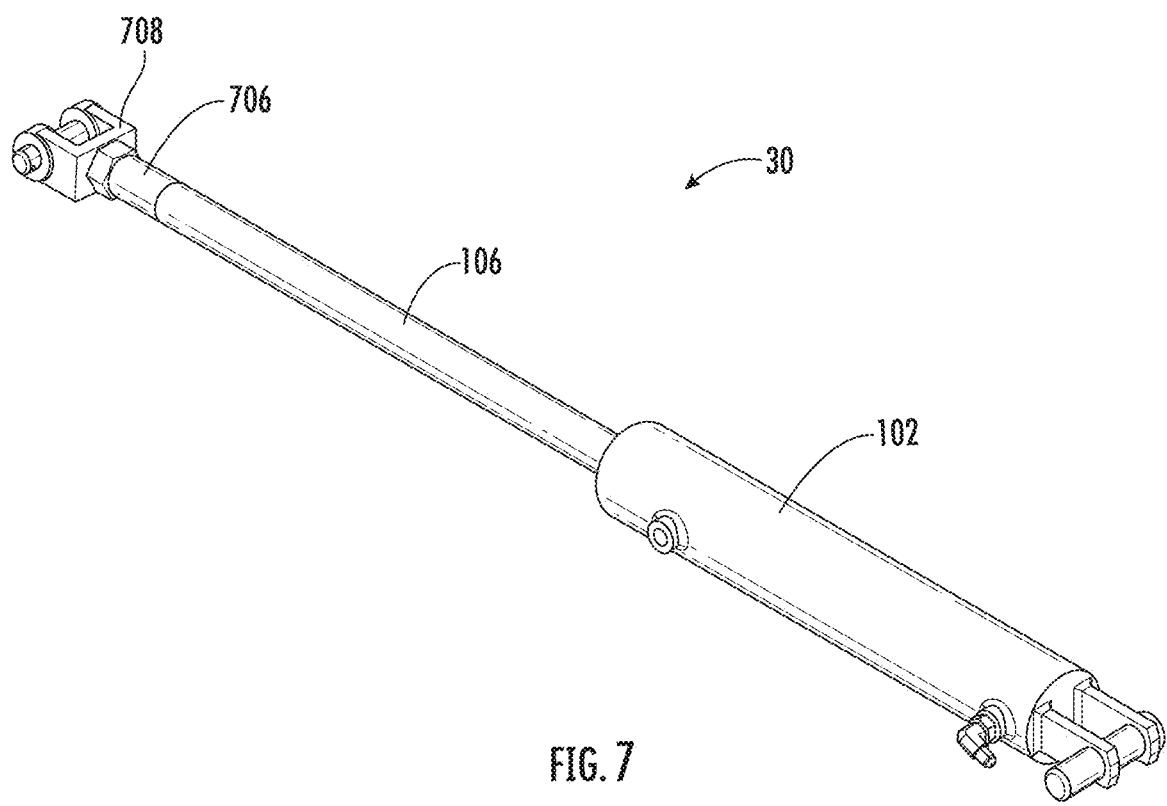
FIG. 7 is a perspective view illustrating a hydraulic cylinder with a rod length adjustment spacer that may be used with embodiments of the present invention.

Referring now to FIG. 7, an aspect of cylinder 30 will be described that is useful in some implementations of the present invention. As one skilled in the art will appreciate, the necessary length of the extended cylinder when the gangway is in the lowered deployed position will generally depend on the length of the gangway itself. Because gangways come in various lengths, this might require stocking multiple cylinder lengths. In accordance with the present invention, however, it has been found that the length of rod 106 can be adjusted using spacer members, such as spacer member 706. As can be seen, spacer member 706 is positioned between the end of rod 106 and the associated coupling 708 by which rod 106 is connected to the gangway. For example, spacer member 706 may have the same connection arrangement by which coupling 708 would otherwise directly connect to rod 106. Spacer members of various lengths may be provided so that the appropriate spacer member can be chosen for the gangway length being used, thereby eliminating or lessening the need to stock cylinders of different lengths.

Figure 8:
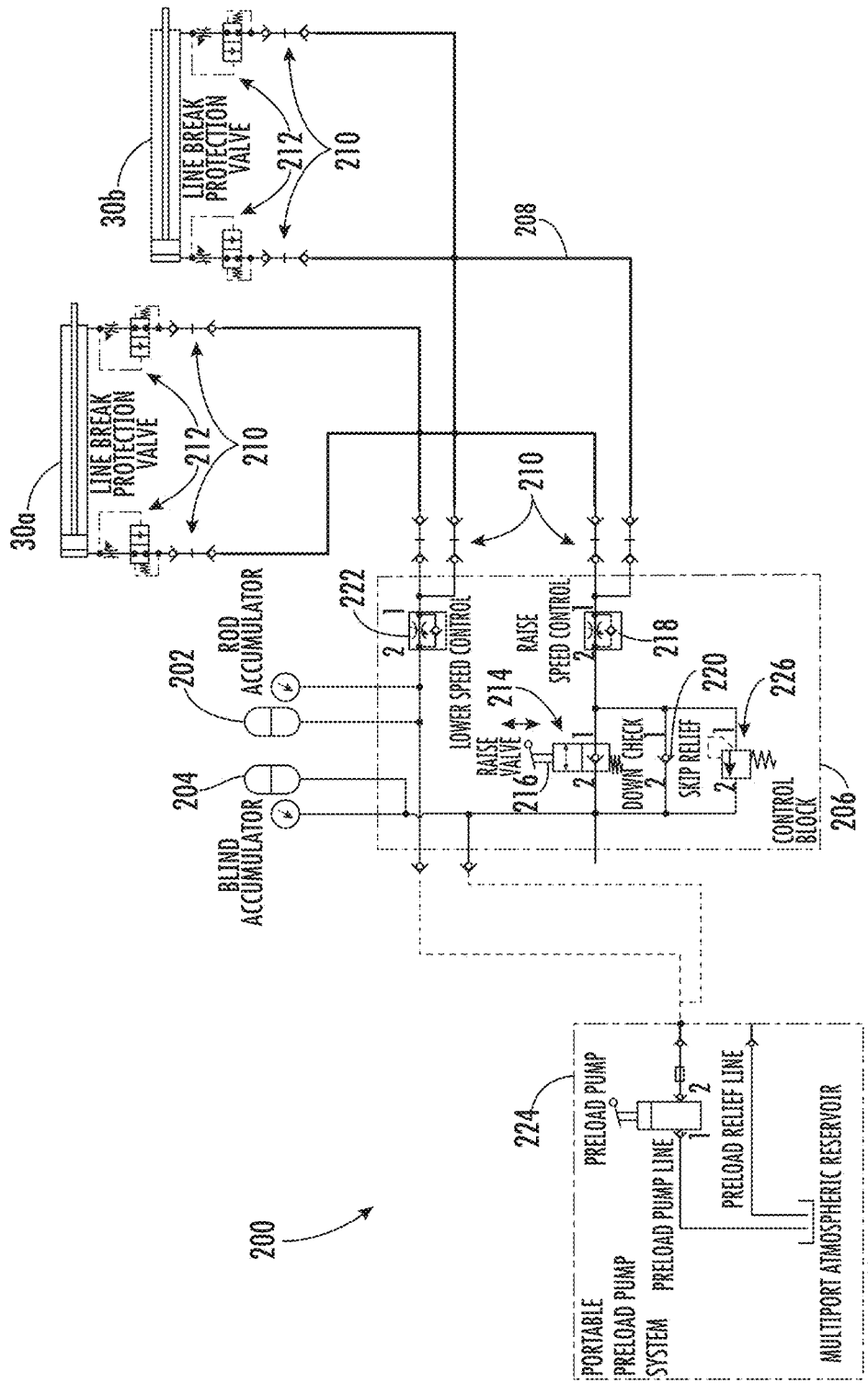
FIG. 8 is a schematic hydraulic circuit diagram illustrating a raising assembly in accordance with an embodiment of the present invention.

FIG. 8 illustrates a gangway raising assembly 200 in accordance with an alternative embodiment. This embodiment utilizes one or more passive energy storage devices to eliminate the need for any source of external energy to raise and lower the gangway. For example, one or more fluid accumulators may be provided to store and release energy as the gangway moves between stowed and lowered positions. Toward this end, a rod accumulator 202 is in fluid communication with the rod sides of cylinders 30a and 30b. A blind accumulator 204 is similarly in fluid communication with the blind sides of cylinders 30a and 30b. Preferably, accumulators 202 and 204 may be diaphragm accumulators having a gas (e.g., nitrogen) on one side of the diaphragm charged to a predetermined at-rest pressure. The hydraulic fluid is on the other side of the diaphragm opposite the gas.

In this embodiment, many of the components are located on a control block 206 which may be mounted on or in the platform or support structure as described above. Hoses (e.g., hose 208) to and from cylinders 30a and 30b and control block 206 may be connected via respective quick disconnect fittings (collectively indicated at 210). This facilitates installation of the gangway and/or assembly 200. In addition, respective line break protection valves (collectively indicated at 212) may be provided to prevent loss of hydraulic fluid if there is a hose break near the cylinders 30a and 30b. Of course, the previous embodiment may also be equipped with various quick disconnects and line break protection valves for the same reasons.

When the gangway is the lowered position, the rods of cylinders 30a and 30b will be extended as described above. As a result, hydraulic fluid will be collected in rod accumulator 202. The diaphragm will thus be compressed and exerting pressure on the hydraulic fluid side of the accumulator. However, fluid is trapped in the blind side of the cylinders 30a and 30b because valve 214 in is the closed position. As a result, the lowered gangway will remain locked in the lowered position.

To raise the gangway, valve 214 is moved to the open position, in this case by depressing a plunger 216. Rod accumulator 202 thus forces fluid back into the rod sides of cylinders 30a and 30b, retracting the pistons. Fluid is pushed out of the blind sides of cylinders 30a and 30b into blind accumulator 204. In this embodiment, plunger 216 will move back to the closed position (e.g., due to an associated spring) if plunger 216 is released. An adjustable orifice in valve 218 controls the flow out of the blind side of the cylinders, thus regulating the speed at which the gangway raises. Preferably, a conventional foot lock may be provided in this embodiment to further maintain the gangway in the stowed position.

To lower the gangway in this embodiment, the operator simply releases the foot lock and pushes the gangway toward the lowered position. After an initial push, gravity and pressure imposed on the collected fluid in blind accumulator 204 causes fluid to flow (through the check valve of valve 214 and an additional check valve 220) into the blind side of cylinders 30a and 30b. Fluid exiting the rod side of cylinders 30a and 30b flows into rod accumulator 202. An adjustable orifice in valve 222 controls the flow out of the rod side of the cylinders, thus regulating the speed at which the gangway lowers.

Upon reading the foregoing, one skilled in the art will be able without undue experimentation to set the precharge of the gas in accumulators 202 and 204 to obtain appropriate operation. In addition, a preload system 224, disconnected during operation, may be provided to facilitate set up of the hydraulic fluid.

A slip relief valve 226 is provided to allow some fluid to leave the blind sides of the cylinders 30a and 30b if high forces are applied to the gangway in an upward direction. Valve 226 bypasses the check valve of valve 214 and check valve 220 if a preset pressure is reached.

Those skilled in the art should appreciate that the above description provides a gangway having a novel raising assembly. While one or more preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A gangway comprising:
    a fixed platform;
    a support structure connected to the fixed platform in a manner that allows the support structure to rotate with respect to the fixed platform between a raised stowed position and a lowered deployed position; and
    a raising assembly operative to rotate the support structure from the deployed position to the stowed position, said raising assembly including:
    first and second fluid actuated cylinders respectively situated on left and right sides of the support structure, the cylinders being connected between the fixed platform and a distal end of the support structure and retractable to rotate the support structure toward the stowed position;
    a raising actuator usable by an operator to cause operation of the cylinders in a manner that rotates the support structure toward the stowed position, the raising actuator including a raising valve; and
    a hydraulic pump driven by a motor.

2. A gangway as set forth in claim 1, wherein the raising actuator comprises a plunger associated with the raising valve, said plunger being movable to change a position of the raising valve.

3. A gangway as set forth in claim 2, wherein said plunger is moved outward to cause raising of the support structure.

4. A gangway as set forth in claim 2, wherein said plunger is moved inward to cause raising of the support structure.

5. A gangway as set forth in claim 1, wherein said motor is a pneumatic motor.

6. A gangway as set forth in claim 1, wherein said motor is an electric motor.

7. A gangway as set forth in claim 6, wherein said electric motor is powered by an AC source.

8. A gangway as set forth in claim 6, wherein said electric motor is powered at least in part by at least one solar panel.

9. A gangway as set forth in claim 1, wherein the raising actuator is configured to cease raising of the support structure if released by the operator.

10. A gangway as set forth in claim 1, wherein said raising assembly further includes a lowering actuator usable by an operator to cause operation of the first and second cylinders in a manner that rotates the support structure toward the deployed position.

11. A gangway as set forth in claim 10, wherein raising assembly is configured such that the support structure will cease further rotation toward the deployed position if said lowering actuator is released.

12. A gangway as set forth in claim 11, wherein said lowering actuator is configured having a master cylinder with an associated lowering plunger, said lowering plunger movable inward to cause unseating of at least one pilot operated check valve.

13. A gangway as set forth in claim 1, wherein said first and second cylinders each include a cylinder rod having a spacer member attached to a distal end thereof.

* * * * *